United States Patent
Garcia et al.

(10) Patent No.: US 7,461,967 B2
(45) Date of Patent: Dec. 9, 2008

(54) RELEASABLE COUPLING DEVICE BETWEEN A TOOL SHANK AND A MOTOR ASSEMBLY IN HAND-HELD BLENDERS

(75) Inventors: Javier Hidalgo Garcia, Guipúzocoa (ES); Aitor Aguirrezabalaga Zubizarreta, Guipúzocoa (ES)

(73) Assignee: Sammic, S.L. Basarte, I, Azkoiutia (Guipuzcoa) (ES)

( * ) Notice: Subject to any disclaimer, the term of this patent is extended or adjusted under 35 U.S.C. 154(b) by 313 days.

(21) Appl. No.: 11/460,660

(22) Filed: Jul. 28, 2006

(65) Prior Publication Data

US 2007/0054744 A1    Mar. 8, 2007

(30) Foreign Application Priority Data

Jul. 28, 2005    (ES) ............................ 200501749 U

(51) Int. Cl.
*A47J 43/044*    (2006.01)
*A47J 43/07*    (2006.01)

(52) U.S. Cl. ..................................... 366/129; 403/322.2

(58) Field of Classification Search ................. 366/129, 366/331, 344; 99/348; 464/160, 177; 403/326, 403/327, 329, 322.1, 322.2
See application file for complete search history.

(56) References Cited

U.S. PATENT DOCUMENTS 2,065,908 A * 12/1936 Pihl ............................ 292/76
4,462,142 A * 7/1984 Hickling ...................... 403/329
5,567,047 A * 10/1996 Fritsch ........................ 366/129
5,685,208 A * 11/1997 Tidwell ..................... 81/177.85
6,554,524 B1 * 4/2003 Smith ........................... 403/78
6,789,933 B2 * 9/2004 Gili et al. ..................... 366/129
6,811,298 B2 * 11/2004 Penaranda et al. ........... 366/129
6,955,117 B2 * 10/2005 Naud et al. ..................... 99/348
7,066,639 B2 * 6/2006 Naud et al. .................. 366/129
7,186,051 B2 * 3/2007 Benedetti et al. ............. 403/388
2006/0291325 A1 * 12/2006 Garcia et al. ................. 366/129

FOREIGN PATENT DOCUMENTS

EP    1733665 A2 * 12/2006
EP    1747745 A1 *  1/2007
FR    2794017    * 12/2000

* cited by examiner

*Primary Examiner*—Charles E Cooley
(74) *Attorney, Agent, or Firm*—Collen IP; Donald J. Ranft

(57) ABSTRACT

The invention discloses a fast and reliable coupling device between a tool shank and a motor assembly of a hand-held blender, which can be released by the user. The motor assembly is of the type that has a cylindrical nozzle centrally positioned on the base by which it couples to the tool shank, the outer side of which has a threaded portion, whilst the tool shank has an internally threaded nut that is complementary to the nozzle, the base of the motor assembly also including a formation that projects outwards, with a hole through which a retaining ball projects, pushed by a spring, whilst radial partitions project from the outer wall of the coupling nut of the tool shank towards the inner face of the coupling bell, one of these partitions having on its upper edge a cup-shaped formation that is of suitable dimensions to admit and house said ball when aligned with it during the coupling operation between said tool shank and motor assembly.

1 Claim, 2 Drawing Sheets

RELEASABLE COUPLING DEVICE BETWEEN A TOOL SHANK AND A MOTOR ASSEMBLY IN HAND-HELD BLENDERS

OBJECT OF THE INVENTION

The present invention relates to a releasable coupling device between a tool shank and a motor assembly in hand-held blenders, which adds essential novel characteristics and considerable advantages compared to the means that are known and used for the same purposes in the current state of the art.

More particularly, the invention proposes the development of a device that makes it possible to couple a tool shank of a hand-held blender and the motor assembly of that machine, simply and quickly, but with the user's absolute certainty that the connection between both pieces has been performed in a suitably reliable way, with an audible warning of the final coupling, and with the particularity that such a connection allows the tool shank to be released, or the two parts to be separated, whenever the user desires, which can be simply and easily performed by the user, but without it being possible for the separation of the parts to occur accidentally at any time.

The invention's field of application is obviously within the industrial sector that manufactures household and kitchen utensils, both for domestic and industrial use.

BACKGROUND AND SUMMARY OF THE INVENTION

It is a widely known fact that hand-held blenders of the type referred to by the present invention have a motor assembly that includes an electric motor that can be electrically powered and which constitutes the drive part, with an output shaft, and a tool shank that, when correctly coupled to said motor assembly, allows the movement of the motor to be transmitted to the proximal end of the shaft that runs along the length of said shank, and which on its opposite end, or distal end, has a blade or similar device for cutting and blending the food to which it is applied or the desired blending operation.

As will be understood, it is necessary for the coupling between the tool shank and the motor assembly to have characteristics that guarantee sufficient safety conditions during its use, but which also allow the tool shank to be released, i.e. allow the tool shank to be separated from the motor assembly when the user desires, with a view to subjecting the former to the necessary operations to keep it in good conditions of hygiene and cleanliness, in addition to any other maintenance operation, repair of any component, or even replacement of the tool shank in the event of it breaking or suffering irreparable damage.

The normal connection between a tool shank and motor assembly in a blender of the type considered here currently consists of the provision of a screw or bayonet type connection. Screw and bayonet connections can be designed in such a way that they are more or less easy to engage/disengage. However, both types of coupling, assembly and fastening have certain drawbacks in practice, because if these connections are performed in such a way that they are easy to engage/disengage, they occasionally present the problem that they accidentally become disengaged while the blender is in use, which clearly represents a hazard for the user; on the other hand, if the coupling is performed in such a way that it is difficult for the user to engage/disengage, this presents a different set of problems, as releasing the tool shank would mean applying excessive force, therefore making it impossible for the user to separate the two parts.

Bearing in mind the drawbacks that exist in the current state of the art with regard to said hand-held blenders, in particular with respect to engaging/disengaging the tool shank and the motor assembly, the main objective proposed by the present invention is to design a coupling that allows the user to perform the coupling or releasing operation easily, conveniently and quickly, yet at the same time with absolute certainty that the connection between the two parts is stable, without the possibility of accidental separation while it is in use, and with the user's full knowledge that the connection has finally been correctly established.

This objective has been fully achieved by the releasable coupling device of the invention, which will be explained below, and the characteristics of which are contained in the characterizing part of the attached claim 1.

Essentially, the coupling device proposed by the present invention is connected to the screw connection habitually used in this type of blenders between the components of the inner nut on the bell at the top of the tool shank and the cylindrical projection or nozzle that extends outwards from the end base of the motor assembly surrounding and protecting the drive shaft that is connected to the motor, said screw connection corresponding to a design of the quick coupling type, with the particularity that the motor assembly additionally includes, in a position radially outside said cylindrical nozzle, the provision of a cylindrical formation inside which the effective means of retention is housed, which consists of a retaining ball that projects through the mouth of said formation, said ball being pushed outwards by a spring housed inside the same formation. Complementing this arrangement, the bell piece of the tool shank, in addition to having a threaded section on its coupling nut that can fit with the threaded section formed on the outer surface of the output nozzle of the motor assembly, has its internal space divided into segments by means of radial partitions, one of these partitions having an integral housing of a semispherical shape whose overall diameter and dimensions are complementary to those of the retaining ball included in the formation of the blender's motor assembly, so that with the coupling between the motor assembly and the tool shank by screwing the nut of the bell onto the cylindrical nozzle of the motor assembly, as the two pieces successively approach one another, the ball comes into contact with the integral housing on the rib of the bell, and after giving elastically against the action of the spring, thanks to the recovery of the spring the ball is finally housed inside the housing when the two pieces are sufficiently aligned with one another, the action of which makes a sound indicating to the user that the effective coupling of the two components has occurred.

As will be understood, the characteristics of the spring are such that they push the ball with an expanding force that is sufficient to ensure a firm and secure connection between the pieces, which prevents the undesired detachment of the motor assembly and the tool shank, whilst its strength is such that it allows the user to detach the two pieces when desired without the need to apply excessive force or other drawbacks.

BRIEF DESCRIPTION OF THE DRAWINGS

These and other characteristics and advantages of the invention will be more clearly shown by means of the detailed description that follows of a preferred embodiment thereof, which is provided as an illustrative and non-limiting example, with reference to the drawings that accompany it, wherein.

DESCRIPTION OF A PREFERRED EMBODIMENT

Figure 1:
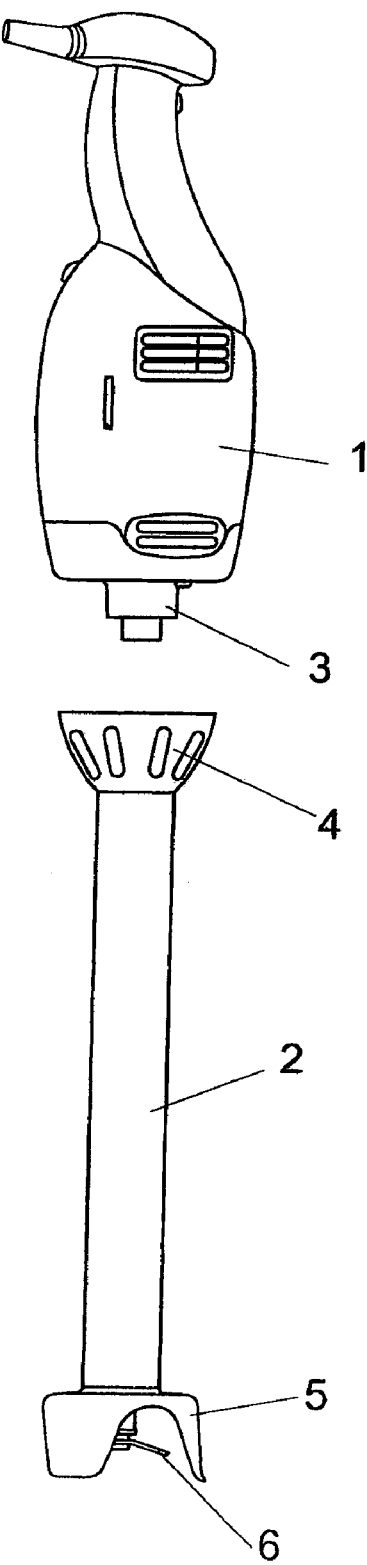
FIG. 1 shows a general side elevation view of a conventional hand-held blender, wherein the tool shank and the motor assembly appear separately, one above the other aligned with each other.

As has been indicated above, a detailed description of the preferred embodiment of the invention will be given below with the aid of the attached drawings, wherein the same numerical references will be used to designate identical or similar parts. Thus, looking first at FIG. 1, it shows a side elevation view of a conventional hand-held blender consisting of a motor assembly 1 and a tool shank 2, which appear one above the other, opposite one another in the coupling position. The motor assembly includes an output nozzle 3 formed on the base that closes the coupling end, in an axially centred position, which surrounds the end of the drive shaft of the electric motor that is enclosed inside the motor assembly 1, and the tool shank has a bell 4 for coupling to the proximal end, or coupling end, whilst at the distal end it has a protective element 5 that surrounds an inner cutting blade 6, and which is connected, as regards its rotation, to a shaft that runs along the inside of said tool shank 2, the proximal end of which can be coupled to the corresponding end of the drive shaft inside the nozzle 3 to transmit the drive movement from the nozzle to said end blade 6.

As will be understood, this description corresponds to a conventional embodiment, i.e. of the type of configuration used in blenders belonging to the current state of the art, and which the invention has used as the starting point for developing the novel and improved releasable coupling device proposed herein.

Figure 2:
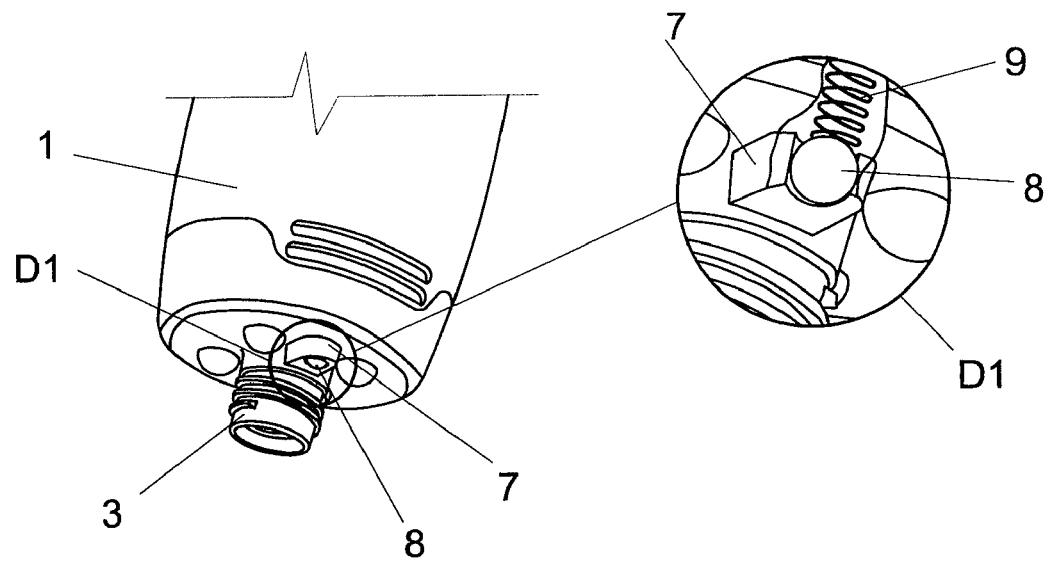
FIG. 2 is a perspective view of an end portion of the motor assembly of a blender of the type shown in the previous figure, as seen from the coupling end, together with a detail D1 showing a sectional view of the formation that contains the retaining ball, and FIG. 3 finally shows a perspective view of a tool shank seen from the end on which the coupling bell is assembled, together with an enlarged detail D2.

Effectively, looking at FIG. 2 it can be seen that a portion of the motor assembly 1 is shown in perspective from underneath, i.e. from the end that couples with the tool shank 2. As can be seen, the nozzle 3 has a quick coupling external threaded section, whilst the underside or base of the motor assembly 1 is provided with the creation of an internally cylindrical integral formation 7 that projects outwards and that is adjacent to and radially separated from said threaded nozzle 3, out of the end mouth of which a spherical element 8 can be seen projecting, in particular a ball of a small diameter that can move inwards against the action of a spring housed inside said formation 7. This device can be seen more easily by studying the detail D1 shown in this same Figure, which shows the external formation 7 partially sectioned on its longitudinal wall, making it possible to see both the position of the ball 8 and that of the spring 9 housed inside said formation 7, which is used to push the ball outwards in order to keep it in its projecting state relative to the plane of the mouth of said formation.

Figure 3:
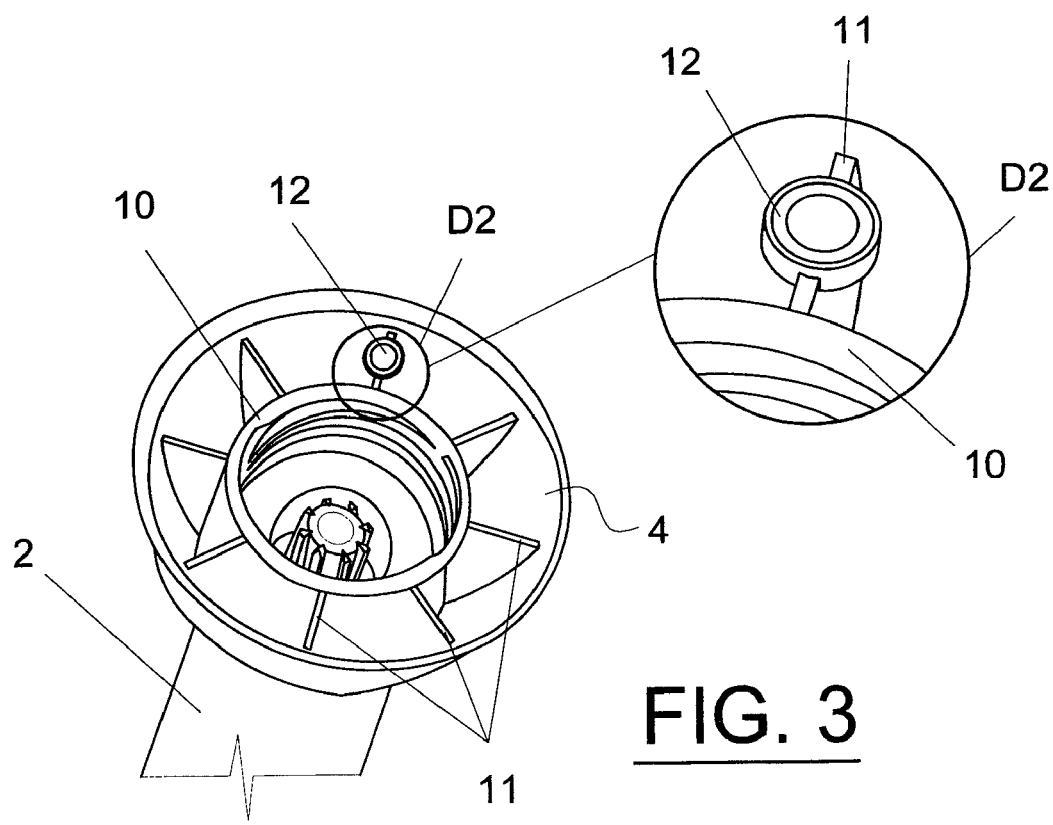

On the other hand, FIG. 3 shows the end of the tool shank 2 with the bell 4 that couples to the motor assembly 1. As can be seen, the space inside the bell has an internally threaded central portion or nut 10, which is of suitable dimensions to be fitted quickly to the nozzle 3 of the motor assembly by screwing the two components together, with partitions 11 extending radially, angularly and equally spaced, from the threaded section 10 towards the inner surface of the wall of the bell 4, thus dividing the interior space into segments, these partitions 11 being of a suitable height so that during the screwing and coupling operation of the tool shank and motor assembly they do not reach the position of the ball 8 until the end of their travel. For this purpose, one of the partitions has an integral formation 12, of a generally semispherical, cup-shaped form, with its mouth slightly raised in relation to the edge of the partition 11 into which it is integrated. This formation is responsible for coupling with the retaining ball 8 installed in the formation 7 on the motor assembly, and therefore, it is responsible for maintaining the connection between the two pieces in their mutually coupled state. To do so, when the user performs the connection by screwing the nut 10 and the nozzle 3 together, as the pieces approach one another due to their axial rotation relative to one another, there comes a moment when the cup-shaped formation 12 reaches the position of the ball, forcing it to retract against the action of the spring 9 until a positional instant later, when the ball and the cavity of the cup-shaped formation 12 are aligned with one another, whereby the recovery of the spring 9 leads the ball to be housed in the cavity, thus ensuring the secure and effective connection between the two components. In this simple way, it is possible to achieve a reliable connection between the tool shank 2 and the motor assembly 1. As will be understood, the detachment of one from the other is achieved by simply rotating one of the pieces in the opposite direction to the coupling direction.

It will also be understood that, as was mentioned at the beginning, the spring 9 will be designed and provided with suitable dimensions so that it simultaneously provides the effect of maintaining a firm connection between the coupled pieces, preventing any undesired rotation and therefore preventing the accidental uncoupling of the pieces, whilst at the same time being sufficiently flexible for the user to uncouple them, without the need to apply excessive force.

It is not considered necessary to prolong this description to enable a person skilled in the art to understand the scope and advantages deriving from the invention, and to develop and put into practice the object thereof.

However, it must be understood that the invention has been described according to a preferred embodiment thereof, which means that it may be subject to modifications without this involving any alteration to the basic concept of said invention, such modifications affecting the shape, size and/or materials employed in manufacturing.

The invention claimed is:

1. Releasable coupling device between a tool shank and a motor assembly in hand-held blenders, in particular a coupling device that enables the user to perform a firm and reliable connection between the two components and easily separate the tool shank (2) from the motor assembly (1) of the blender when cleaning, maintenance or replacement operations of the tool shank (2) are to be performed, the connection between which is determined by an externally threaded cylindrical nozzle (3) formed on the closing base at the distal end of the motor assembly (1), through which the drive shaft is accessed, and a nut portion (10) complementarily threaded on its inner face, formed on the inside of a coupling bell piece (4) on the proximal end of the tool shank (2), the inside of the coupling bell also having multiple angularly equally-spaced partitions (11) that extend radially between said nut portion (10) and the inner surface of the wall of the coupling bell (4) to form a succession of hollow interior segments, which is characterised in that the motor assembly (1) additionally includes an external formation (7) that projects from the closing base of its distal end, adjacent to and radially separated from the nozzle (3) of the motor assembly (1), said formation (7) having a cylindrical hole in which a spring (9) is housed, which outwardly pushes on a retaining ball (8) that partially projects through the mouth of said external formation (7), and in that the bell (4) includes, on one of the radial partitions (11), a cup-shaped formation (12) with the edge of the partition into which it is integrated, said cup-shaped formation being generally semispherical with its mouth slightly raised in relation to the edge of said partition (11) to which it is connected, said cup-shaped formation being designed and provided with suitable dimensions to house the retaining ball (8) when, with the relative rotation between the tool shank (2) and the motor assembly (1) during the mutual coupling operation between the two pieces, said cup-shaped formation (12) reaches the position of the ball (8), pushing it first against the action of the spring and then allowing it to be housed therein.

\* \* \* \* \*